(12) United States Patent
Nojiri et al.

(10) Patent No.: US 12,397,860 B2
(45) Date of Patent: Aug. 26, 2025

(54) DRIVING ASSISTANCE DEVICE AND DRIVING ASSISTANCE METHOD

(71) Applicant: Panasonic Intellectual Property Management Co., Ltd., Osaka (JP)

(72) Inventors: Atsushi Nojiri, Tokyo To (JP); Masayuki Fukuyama, Osaka Fu (JP); Hirofumi Nishimura, Kanagawa Ken (JP); Yoshimasa Okabe, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 71 days.

(21) Appl. No.: 18/583,379

(22) Filed: Feb. 21, 2024

(65) Prior Publication Data

US 2024/0326911 A1    Oct. 3, 2024

(30) Foreign Application Priority Data

Mar. 28, 2023 (JP) .................................. 2023-051003

(51) Int. Cl.
*G08G 1/14* (2006.01)
*B60W 30/06* (2006.01)
(Continued)

(52) U.S. Cl.
CPC ........... *B62D 15/028* (2013.01); *B60W 30/06* (2013.01); *B60W 30/182* (2013.01);
(Continued)

(58) Field of Classification Search
CPC . B62D 15/028; B62D 15/0285; B60W 30/06; B60W 30/182; B60W 50/14; B60W 2050/146; B60W 2510/20
(Continued)

(56) References Cited

U.S. PATENT DOCUMENTS 11,208,147 B2 * 12/2021 Kamiyama ............... B60R 1/27
2003/0150661 A1 * 8/2003 Kataoka ............. B62D 15/0285
180/204

(Continued)

FOREIGN PATENT DOCUMENTS

JP    2017/138664    8/2017
JP    2021/124898    8/2021

*Primary Examiner* — Anh V La
(74) *Attorney, Agent, or Firm* — GREENBLUM & BERNSTEIN, P.L.C.

(57) ABSTRACT

A driving assistance device includes a processor connected to a memory. In a teaching traveling mode, the processor stores, in the memory, a teaching traveling path obtained by a vehicle traveling from a current position to a start position designated by a user, and generates teaching data related to a teaching path obtained by reversing the teaching traveling path from an end point toward a start point. The processor causes the vehicle to travel along the teaching path in an automated traveling mode. The processor generates, in the teaching traveling mode, a recommended path in which a turning radius of a stroke of forward travel is larger than a turning radius of a stroke of backward travel in a range from the current position to the start position. The processor outputs, in the teaching traveling mode, display information for displaying a display screen including the recommended path.

20 Claims, 9 Drawing Sheets

(51) Int. Cl.
*B60W 30/182* (2020.01)
*B60W 50/14* (2020.01)
*B62D 15/02* (2006.01)

(52) U.S. Cl.
CPC ....... *B60W 50/14* (2013.01); *B60W 2050/146* (2013.01); *B60W 2510/20* (2013.01)

(58) Field of Classification Search
USPC .................. 340/932.2, 933, 988, 990, 995.1
See application file for complete search history.

(56) References Cited

U.S. PATENT DOCUMENTS

| | | |
|---|---|---|
| 2019/0039605 A1 | 2/2019 | Iio et al. |
| 2019/0270451 A1* | 9/2019 | Liu ...................... G05D 1/0221 |
| 2020/0055514 A1* | 2/2020 | Tsuge .................. B60W 30/095 |
| 2022/0274585 A1* | 9/2022 | Yamaguchi ........... B60W 10/18 |
| 2022/0371579 A1 | 11/2022 | Tokuhiro |

* cited by examiner

DURING AUTOMATED TRAVELING MODE

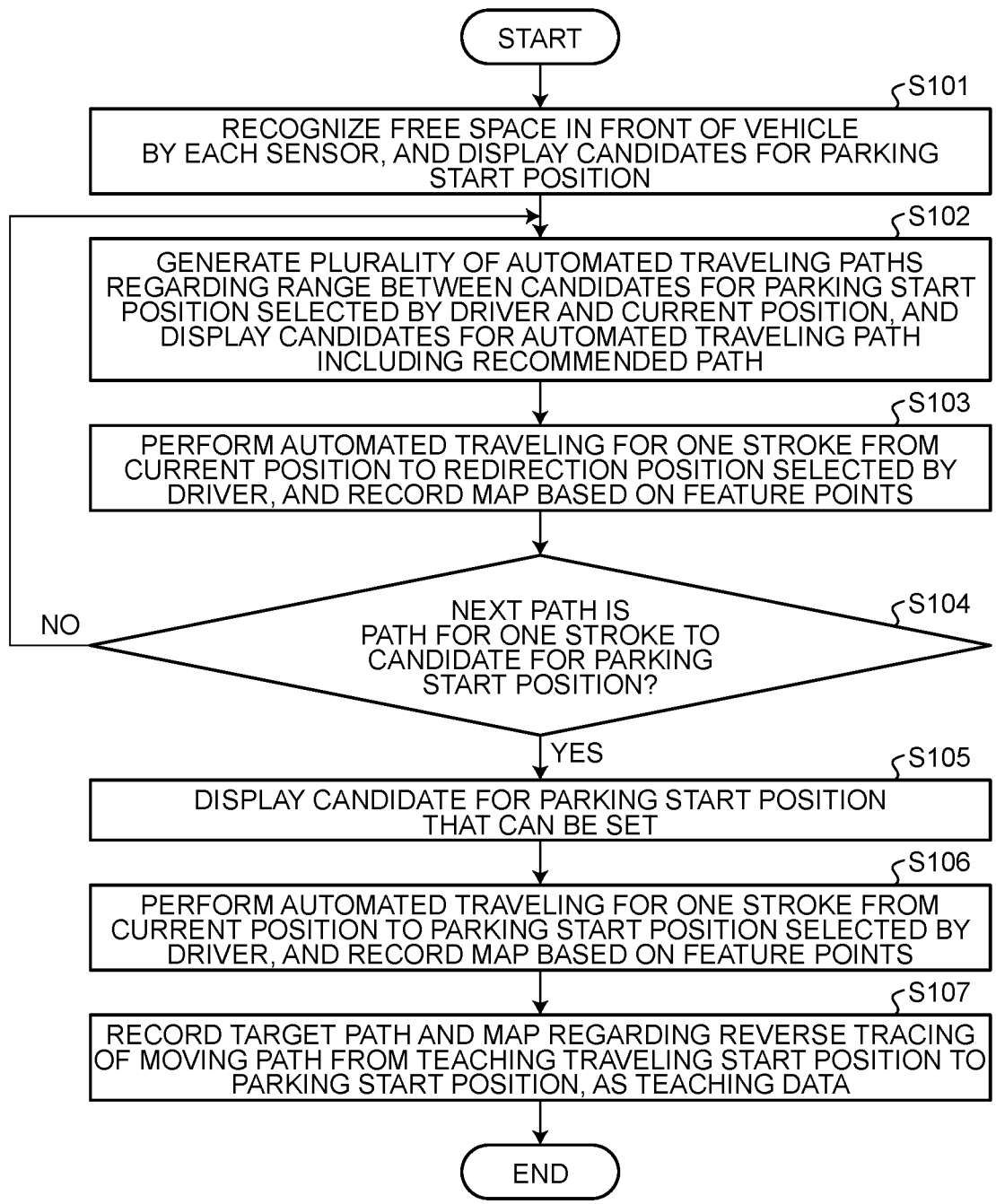

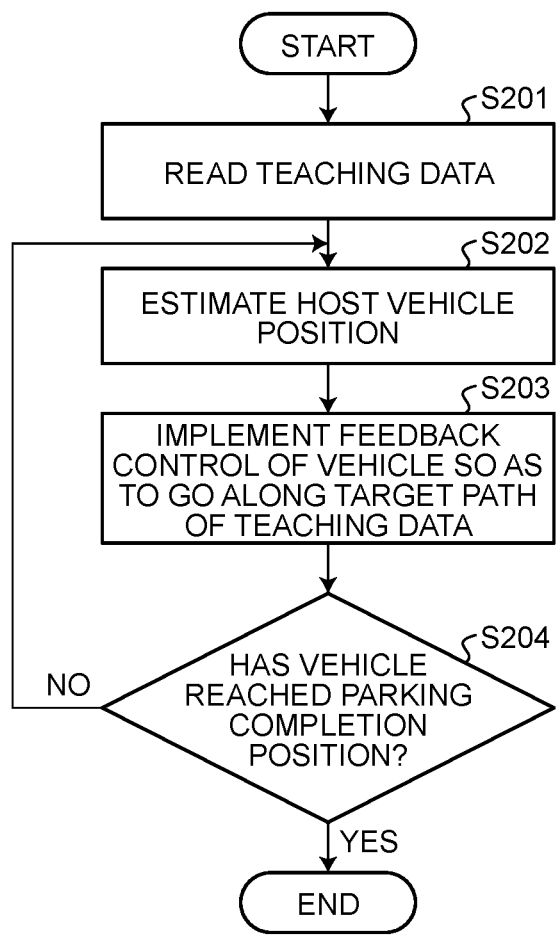

DRIVING ASSISTANCE DEVICE AND DRIVING ASSISTANCE METHOD

CROSS-REFERENCE TO RELATED APPLICATIONS

This application is based upon and claims the benefit of priority from Japanese Patent Application No. 2023-051003, filed on Mar. 28, 2023, the entire contents of which are incorporated herein by reference.

FIELD

The present disclosure relates generally to a driving assistance device and a driving assistance method.

BACKGROUND

In general, there are cases having difficulty in parking a vehicle in a parking space at a house because of its limited area, leading to a high demand for the capability of performing parking and exiting by automated driving.

In order to implement such a type of automated driving, there are various known driving assistance devices.

As an example of use of this type of driving assistance device, when the driver stops the vehicle at an initial stop position predetermined in advance, automated driving is performed by automatically assisting parking of the vehicle so as to travel from the initial stop position to a target parking position.

The driving assistance device performs automated recognition of a parking space and a position of the vehicle by using various sensors mounted on the vehicle, and performs automated operations such as a steering operation, an accelerator operation, and a brake operation.

In order to implement such automated driving, a patent literature JP 2021-124898 A discloses a technique of performing reproduced traveling. According to this technique, a vehicle is controlled to travel from a target parking position to a predetermined position (parking start position) outside a parking lot by a driving operation of a driver on the vehicle (hereinafter, referred to as a "user"), and a path reversely tracing a moving path during the traveling is stored as teaching data, whereby the vehicle is controlled to perform automated traveling along the path in a subsequent parking scene.

However, the reproduced traveling based on the reversely reproduced path (teaching path), in which the moving path during the teaching traveling is traced in reverse, might become unnatural traveling due to the fact that the traveling direction of the vehicle is different from the direction during the teaching traveling.

SUMMARY

A driving assistance device according to the present disclosure includes a hardware processor connected to a memory. The hardware processor is configured to perform processing in a teaching traveling mode. The processing includes storing a teaching traveling path in the memory. The teaching traveling path is obtained by a vehicle traveling from a current position to an automated traveling start position designated by a user. The processing also includes generating teaching data related to a teaching path. The teaching path is obtained by reversing the teaching traveling path in a manner of being directed from an end point toward a start point. The hardware processor is configured to cause the vehicle to travel along the teaching path in an automated traveling mode. The hardware processor is configured to generate, in the teaching traveling mode, a recommended path in which a turning radius of a stroke of forward travel is larger than a turning radius of a stroke of backward travel in a range from the current position to the automated traveling start position. The hardware processor is configured to output, in the teaching traveling mode, display information for displaying a display screen including the recommended path.

BRIEF DESCRIPTION OF THE DRAWINGS

FIG. 11 is a flowchart illustrating an example of a procedure of the assistance process in a teaching traveling mode executed by the driving assistance device according to the embodiment; and FIG. 12 is a flowchart illustrating an example of a procedure of the assistance process in an automated traveling mode executed by the driving assistance device according to the embodiment.

DETAILED DESCRIPTION

Figure 1:
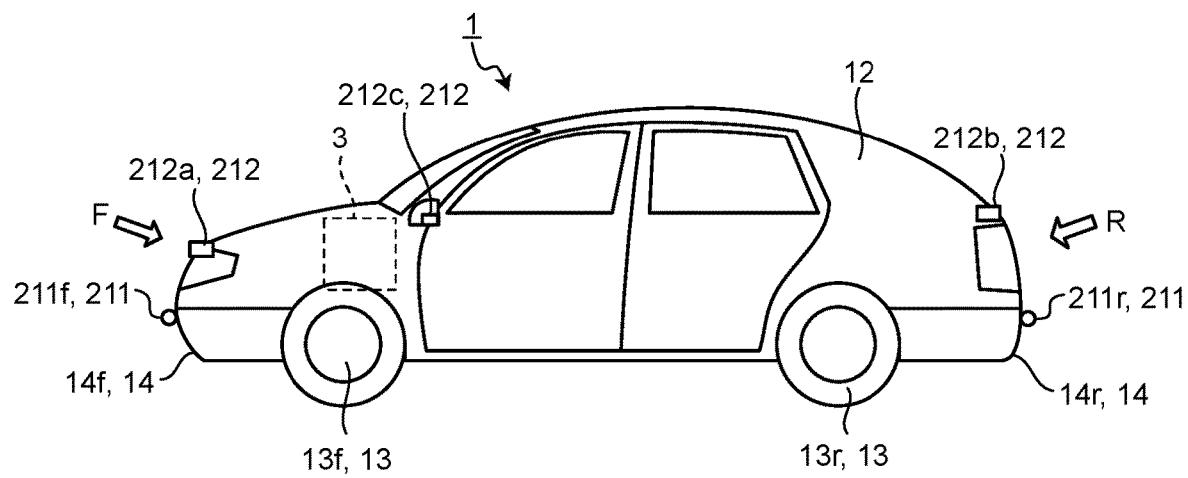
FIG. 1 is a diagram schematically illustrating an example of a vehicle equipped with a driving assistance device according to an embodiment.

Hereinafter, an embodiment of a driving assistance device, a vehicle, a driving assistance method, a program, and a recording medium according to the present disclosure will be described with reference to the drawings.

In the description of the present disclosure, components having the same or substantially the same functions as those described above with respect to the already described drawings are denoted by the same reference numerals, and the description thereof may be appropriately omitted. In addition, even in the case of representing the same or substantially the same portion, representation of the dimensions and ratios may be different from each other depending on the drawings. Moreover, for example, from the viewpoint of ensuring visibility of the drawings, there may be a case, in the description of each drawing, where only main components are denoted by reference numerals, and even components having the same or substantially the same functions as those described above in the previous drawings are not denoted by reference numerals.

In the description of the present disclosure, constituent elements having the same or substantially the same function may be distinguished and described by adding alphanumeric characters to the end of reference numerals. Alternatively, when not distinguishing a plurality of constituent elements having the same or substantially the same function, the constituent elements may be integrally described by omitting alphanumeric characters added to the end of the reference numerals.

FIG. 1 is a diagram schematically illustrating an example of a vehicle 1 equipped with a driving assistance device 3 according to the embodiment. As illustrated in FIG. 1, the vehicle 1 includes a vehicle body 12 and two pairs of wheels 13 disposed in a predetermined direction on the vehicle body 12. The two pairs of wheels 13 include a pair of front tires 13$f$ and a pair of rear tires 13$r$.

The front tire 13$f$ according to the embodiment is an example of a first wheel. The rear tire 13$r$ according to the embodiment is an example of a second wheel. While FIG. 1 exemplifies the vehicle 1 having four wheels 13, the vehicle 1 is not limited thereto. The vehicle 1 only needs to include at least one front tire 13$f$ and at least one rear tire 13$r$. The wheels 13 of the vehicle 1 may be provided in plurality, that is, the number may be two, three, or five or more.

A direction of at least one wheel (steered wheel) of the wheels 13 of the vehicle 1 electrically or mechanically interlocks with, for example, a rotation angle of a steering wheel disposed in front of a driver's seat 150$a$, that is, a steering angle. That is, the vehicle 1 can turn right or left by steering. The steered wheel may be the rear tire 13$r$ or both the front tire 13$f$ and the rear tire 13$r$.

The vehicle body 12 is supported by wheels 13. The vehicle 1 includes a driving machine (not illustrated), and is movable by driving at least one wheel (driving wheel) of the wheels 13 of the vehicle 1 by power of the driving machine. Applicable driving machines include any driving machine such as an engine using gasoline, hydrogen, or the like as a fuel, a motor using electric power from a battery, or a combination of an engine and a motor. In this case, a predetermined direction in which the two pairs of wheels 13 are disposed is the traveling direction of the vehicle 1. The vehicle 1 can travel forward or backward by switching gears (not illustrated) or the like.

The vehicle body 12 has a front end F which is an end on the front tire 13$f$ side and a rear end R which is an end on the rear tire 13$r$ side. The vehicle body 12 has a substantially rectangular shape in top view, and four corners of the substantially rectangular shape may be referred to as ends.

There is provided a pair of bumpers 14 near the lower end of the vehicle body 12 at the front and rear ends (front end F and rear end R) of the vehicle body 12. A front bumper 14$f$ of the pair of bumpers 14 covers the entire front surface and a part of the side surface in the vicinity of the lower end of the vehicle body 12. A rear bumper 14$r$ of the pair of bumpers 14 covers the entire rear surface and a part of the side surface in the vicinity of the lower end of the vehicle body 12.

Figure 2:
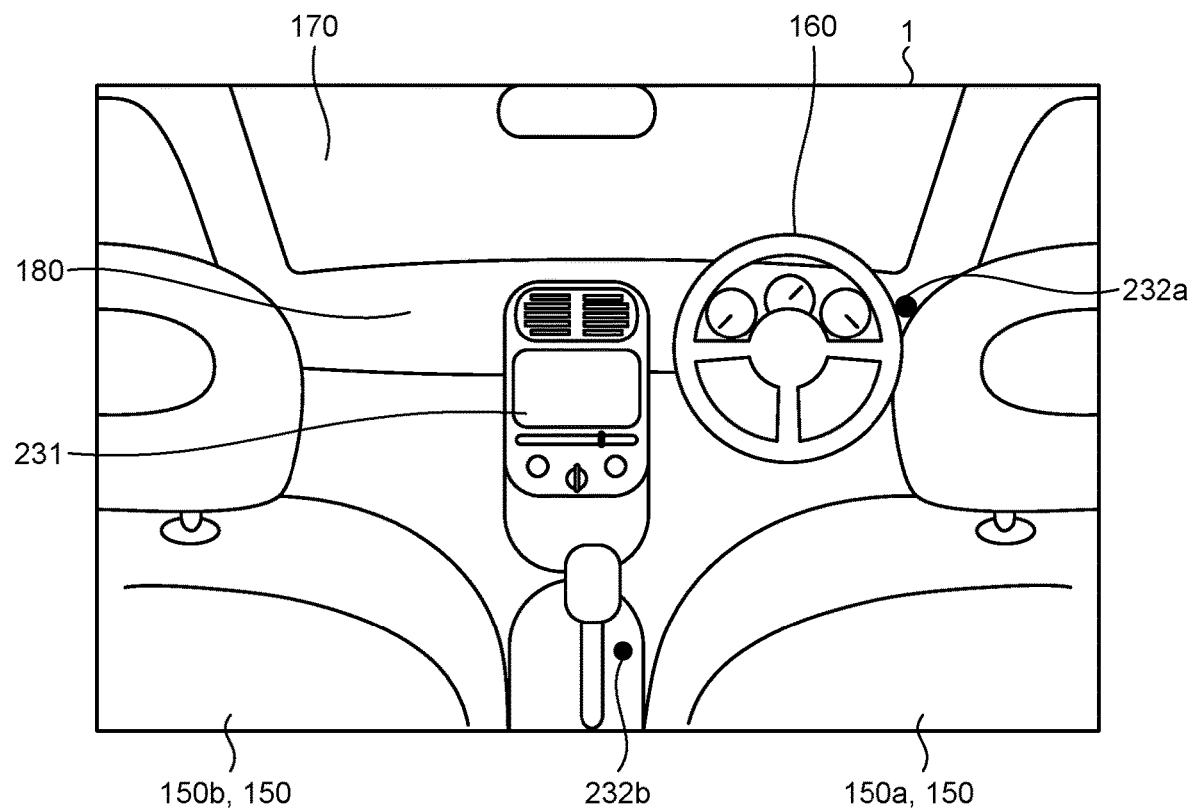
FIG. 2 is a diagram illustrating an example of a configuration in the vicinity of a driver's seat of the vehicle according to the embodiment.

A configuration in the vicinity of the driver's seat of the vehicle 1 of the present embodiment will be described. FIG. 2 is a diagram illustrating an example of a configuration in the vicinity of a driver's seat 150$a$ of the vehicle 1 according to the embodiment.

As illustrated in FIG. 2, the vehicle 1 includes at least one seat 150. FIG. 2 exemplifies a driver's seat 150$a$ and a passenger seat 150$b$ as the seat 150. In addition, in front of the driver's seat 150$a$, there are provided a steering wheel 160, a windshield 170, a dashboard 180, a display device 231, and an operation button 232$a$. There is provided an operation button 232$b$ on the side of the driver's seat 150$a$, for example, on the console.

The steering wheel 160 is provided in front of the driver's seat 150$a$ and can be operated by the driver. The rotation angle of the steering wheel 160, that is, the steering angle, is electrically or mechanically interlocked with a change in the direction of the front tire 13$f$, which is a steered wheel. The steered wheel may be the rear tire 13$r$ or both the front tire 13$f$ and the rear tire 13$r$.

As illustrated in FIG. 1, the vehicle 1 is equipped with the driving assistance device 3. The driving assistance device 3 is an information processing device that can be mounted on the vehicle 1, and is implemented by an electronic control unit (ECU) or an on board unit (OBU) provided inside the vehicle 1, for example. Alternatively, the driving assistance device 3 may be an external computer installed near the dashboard 180 of the vehicle 1 or may also serve as another device such as a car navigator.

Figure 3:
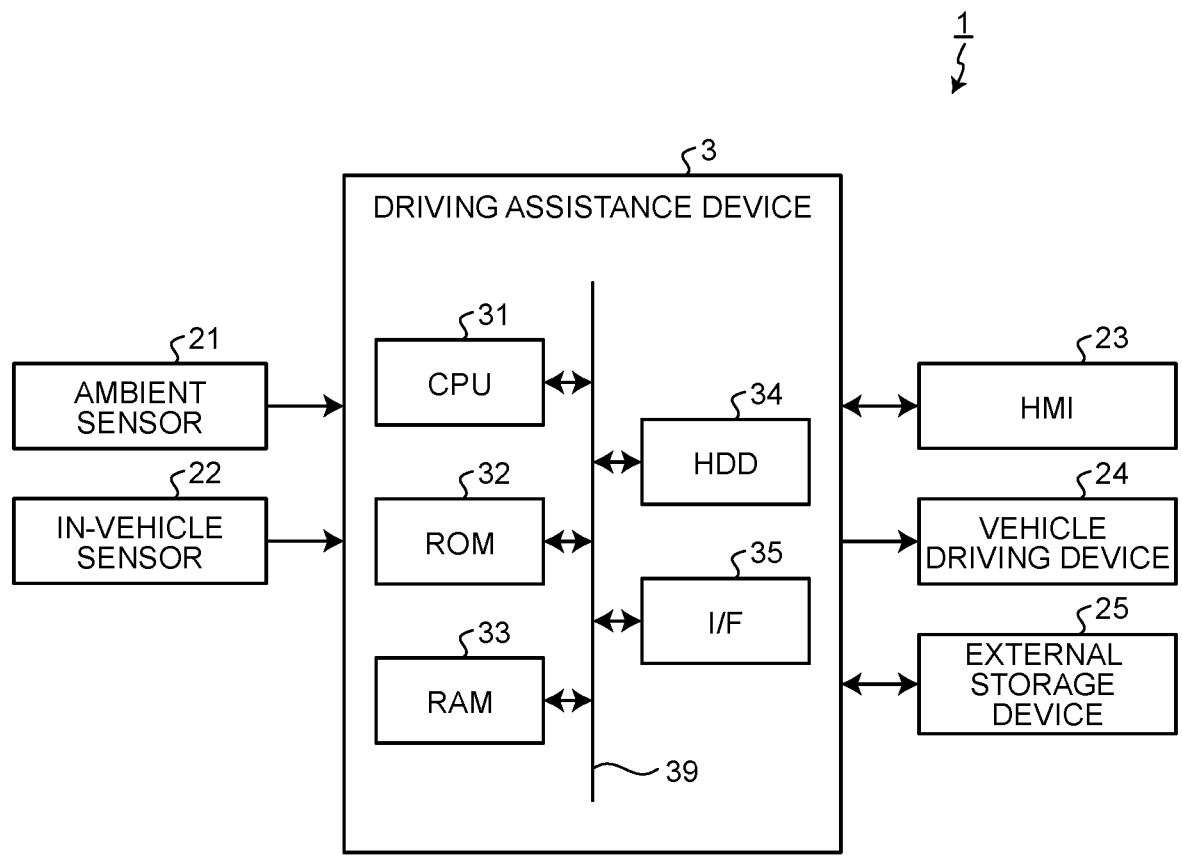
FIG. 3 is a diagram illustrating an example of a hardware configuration of the driving assistance device according to the embodiment.

FIG. 3 is a diagram illustrating an example of a hardware configuration of the driving assistance device 3 according to the embodiment. As illustrated in FIG. 3, the driving assistance device 3 includes a central processing unit (CPU) 31, read only memory (ROM) 32, random access memory (RAM) 33, a hard disk drive (HDD) 34, and an interface (I/F) 35. The CPU 31, the ROM 32, the RAM 33, the HDD 34, and the I/F (interface) 35 are mutually connected by a bus 39 or the like, so as to form a hardware configuration using a normal computer.

The CPU 31 is an arithmetic device that performs overall control of the driving assistance device 3. The CPU 31 loads a program stored in the ROM 32 or the HDD 34 onto the RAM 33 and executes the program, thereby implementing each process that will be described later. The ROM 32 stores programs, parameters, and the like that implement various processes performed by the CPU 31. The RAM 33 is a main storage device of the driving assistance device 3, for example, and temporarily stores data necessary for various processes performed by the CPU 31.

The CPU 31 according to the embodiment is an example of a processor in the driving assistance device 3. As the processor, another type of processor may be provided instead of the CPU 31 or in addition to the CPU 31. Applicable examples of the another type of processor include various processors such as a graphics processing unit (GPU) and a digital signal processor (DSP), or circuits such as a dedicated arithmetic circuit implemented by an application specific integrated circuit (ASIC) and a field programmable gate array (FPGA).

The HDD 34 stores various data, computer programs, and the like used by the driving assistance device 3. In one example, the HDD 34 stores information obtained from an ambient sensor 21 such as a sonar 211 and a surround view camera 212, and information obtained from an in-vehicle sensor 22 such as an azimuth sensor and a GNSS sensor. Note that, instead of the HDD 34 or in addition to the HDD 34, various storage media and storage devices such as a solid state drive (SSD) and a flash drive can be used as appropriate. The HDD 34 is not an essential component, and need not be provided inside the driving assistance device 3. In this case, some or all of various data used by the driving assistance device 3 may be stored in an external storage device 25.

The I/F 35 is an interface for transmitting and receiving data. The I/F 35 receives data from other devices provided in the vehicle 1, such as the ambient sensor 21, the in-vehicle sensor 22, an HMI 23, and the external storage device 25 on the vehicle 1, for example. In addition, the I/F 35 transmits data to other devices provided in the vehicle 1, for example, the HMI 23, a vehicle driving device 24, and the external storage device 25.

Note that the I/F 35 may transmit and receive information to and from another ECU mounted on the vehicle 1 via an in-vehicle network including a controller area network (CAN), Ethernet (registered trademark), or the like in the vehicle 1, or may communicate with an information processing device outside the vehicle 1 via a network such as the Internet. For example, the driving assistance device 3 is connected to each of the ambient sensor 21, the in-vehicle sensor 22, the HMI 23, the vehicle driving device 24, and the external storage device 25 of the vehicle 1 via the in-vehicle network.

The vehicle 1 is equipped with sensors. For example, as illustrated in FIG. 3, the vehicle 1 is equipped with the ambient sensor 21 and the in-vehicle sensor 22.

The ambient sensor 21 is a sensor that monitors the ambient environment of the vehicle 1. FIG. 1 illustrates the sonar 211 and the surround view camera 212 as the ambient sensor.

The sonar 211 is provided at a predetermined end of the vehicle body 12, for example, and transmits and receives a sound wave such as an ultrasonic wave. The sonar 211 includes wave transmitters/receivers 211*f* and 211*r*. For example, one or more wave transmitters/receivers 211*f* are disposed on the front bumper 14*f*, while one or more wave transmitters/receivers 211*r* are disposed on the rear bumper 14*r*. Moreover, the number and/or positions of the wave transmitters/receivers 211*f* and 211*r* can be changed as appropriate, not limited to the example illustrated in FIG. 1. For example, the vehicle 1 may include wave transmitters/receivers 211*f* and 211*r* on the left and right sides.

The sonar 211 detects an obstacle around the vehicle 1 on the basis of the transmission/reception result of the sound wave. In addition, the sonar 211 measures a distance between the vehicle 1 and an obstacle around the vehicle 1 on the basis of the transmission/reception result of the sound wave.

The present embodiment exemplifies the sonar 211 using a sound wave such as an ultrasonic wave, but the configuration is not limited thereto. For example, the vehicle 1 may include a radar or a light detection and ranging (LiDAR) that transmits and receives electromagnetic waves instead of or in addition to the sonar 211.

The surround view camera 212 is provided in the vehicle 1 so as to capture an ambient image of the vehicle 1. In one example, the vehicle 1 includes, as the surround view camera 212, a front camera 212*a* that images the front, a rear camera 212*b* that images the rear, a left side camera 212*c* that images the left side, and a right side camera (not illustrated) that images the right side.

The surround view camera 212 captures an image around the vehicle 1. The surround view camera 212 is, for example, a camera that captures an image based on visible light and/or infrared light. The image captured by the surround view camera 212 may be a moving image or a still image.

Note that the position and/or number of the surround view cameras 212 can be changed as appropriate, not limited to the example illustrated in FIG. 1. For example, the vehicle 1 may include only two cameras, namely, the front camera 212*a* and the rear camera 212*b*. Alternatively, the vehicle 1 may further include another camera in addition to the above-described example. For example, a part or all of the surround view camera 212 may be provided in a vehicle interior space (the inside) of the vehicle 1. The surround view camera 212 may be a camera built in the vehicle 1, an on-dash drive recorder camera added to the vehicle 1, or the like.

The in-vehicle sensor 22 is a sensor that detects a traveling state of the vehicle 1. The in-vehicle sensor 22 includes various sensors such as an accelerator position sensor that detects an accelerator position, a steering angle sensor that detects a steering angle of a steering wheel 160, an acceleration sensor that detects acceleration acting in the front-rear direction of the vehicle 1, a gyro sensor that detects angular velocity acting on the vehicle 1, a torque sensor that detects torque acting on a power transmission mechanism between the wheel 13 of the vehicle 1 and a power source, a vehicle speed sensor that detects a vehicle speed of the vehicle 1, and a wheel speed sensor, for example. Moreover, the in-vehicle sensor 22 to be mounted may include an azimuth sensor or a GNSS sensor.

The HMI 23 is an interface for outputting various types of information such as notification, guidance, and warning to the driver of the vehicle 1. The HMI 23 is an interface for receiving input of various types of information made by the driver of the vehicle 1. The HMI 23 only needs to be configured and disposed to be able to output notification, guidance, or warning so as to be recognizable by the driver of the vehicle 1 and able to receive input of various types of information from the driver of the vehicle 1. The HMI 23 is provided around the driver's seat 150*a* of the vehicle 1, for example, but may be provided in another portion such as a rear seat.

The HMI 23 includes a display device that displays various types of information such as notification, guidance, and warning to the driver of the vehicle 1. The HMI 23 as a display device is disposed so as to be visually recognizable by a user (driver). In one example, the HMI 23 includes a display device 231 provided on the dashboard 180 or a console of the vehicle 1 and configured to be able to output an image. FIG. 2 illustrates the display device 231 disposed in the center of the dashboard 180. Examples of the display device 231 include a liquid crystal display (LCD) or an organic electro luminescence (EL) display. The HMI 23 as the display device according to the embodiment is an example of a display unit. The HMI 23 as a display unit displays various screens on the basis of various types of display information from a display image generation unit 303 that will be described later.

The display device 231 may be configured as a touch panel display. In addition, the display device 231 may be a part of a car navigator mounted on the vehicle 1. Moreover, the display may be a projection-type display device such as a Head Up Display (HUD) that projects an image (virtual image) in front of the driver, for example, on the windshield 170, the dashboard 180, a display region provided on the console, or the like.

The HMI 23 is not limited to the display device alone, and may include another output device such as a speaker capable of outputting a notification sound, a warning sound, or voice.

In addition, the HMI 23 includes an input device that receives an input of various types of information made by the driver of the vehicle 1. In one example, the HMI 23 includes a touch panel of the display device 231 configured as a touch panel display, as an input device. In one example, the HMI 23 includes operation buttons 232a and 232b as input devices. FIG. 2 illustrates an operation button 232a disposed on an instrument panel and an operation button 232b provided on the console. The HMI 23 as the input device according to the embodiment is an example of an operation unit.

The HMI 23 as an operation unit outputs signals corresponding to various user operations on the touch panel or the operation buttons 232a and 232b on the display device 231 from the user to the driving assistance device 3.

It is also allowable to omit one of the operation buttons 232a and 232b. The operation buttons 232a and 232b may be provided at other positions such as the steering wheel 160 and the dashboard 180. In addition, in a case where there is another input device such as a case where a touch panel of the display device 231 is available as an input device of the HMI 23, the operation buttons 232a and 232b may be omitted.

The HMI 23 may include other input devices such as other buttons, dials, switches, and microphones. These input devices are disposed on locations such as the dashboard 180, an instrument panel, a steering wheel 160, a console of the vehicle 1, for example.

An output device, an input device, or an input/output device of the HMI 23 may be implemented by using an operation terminal capable of receiving, transmitting, or exchanging a signal with the vehicle 1 from the outside of the vehicle 1, such as a tablet terminal, a smartphone, a remote controller, or an electronic key.

As illustrated in FIG. 3, the vehicle 1 is equipped with a vehicle driving device 24 and an external storage device 25.

The vehicle driving device 24 controls steering and acceleration/deceleration of the vehicle 1, and implements driving, braking, and turning motions necessary for traveling of the vehicle 1. The vehicle driving device 24 includes, for example, a power source such as a drive motor or an engine, a power transmission mechanism, devices such as a brake device and a steering device, and an electronic driving assistance device that controls these components. The vehicle driving device 24 drives the wheels 13 so as to be in a direction corresponding to, for example, a control signal corresponding to a driver's operation amount of the steering wheel 160 or a control signal from the driving assistance device 3. The vehicle driving device 24 operates a brake device, changes a shift (a gear ratio of a power transmission mechanism), or controls output of a power source on the basis of, for example, a detection result of a brake sensor (in-vehicle sensor 22) that detects an operation amount of a brake pedal by a driver or a control signal from the driving assistance device 3, thereby braking the vehicle 1 or decelerating the vehicle 1. The vehicle driving device 24 changes a gear shift (a gear ratio of a power transmission mechanism) or controls output of the power source on the basis of a detection result of an accelerator sensor (in-vehicle sensor 22) that detects an operation amount of an accelerator pedal by a driver or on the basis of a control signal from the driving assistance device 3, for example, thereby accelerating the vehicle 1.

The external storage device 25 may be implemented by appropriately using various storage media and storage devices such as an HDD, an SSD, and a flash drive, for example. The external storage device 25 stores, for example, a surrounding environment map and entrance path data (teaching data) generated when the driving assistance device 3 travels in the teaching traveling mode. Part or all of the surrounding environment map and the entrance path data may be stored in the HDD 34 of the driving assistance device 3.

FIG. 3 illustrates a case where the ambient sensor 21, the in-vehicle sensor 22, the HMI 23, the vehicle driving device 24, and the external storage device 25 are not included in the driving assistance device 3. However, the configuration is not limited thereto. Some or all of these devices may be included in the driving assistance device 3.

The driving assistance device 3 according to the embodiment is capable of switching between the teaching traveling mode and the automated traveling mode on the basis of the input operation of the user to the HMI 23. In each of the teaching traveling mode and the automated traveling mode according to the present embodiment, the vehicle 1 undergoes automated traveling control by the driving assistance device 3 without requiring user's driving operation. The teaching traveling mode is a mode for registering a target path (teaching path) as a target in the automated traveling mode. The automated traveling mode is a mode of controlling the vehicle 1 to perform automated traveling in accordance with the teaching path registered in the teaching traveling mode. The automated traveling mode can also be expressed as a reproduced traveling mode of reproducing movement along the registered teaching path.

The present embodiment will describe an exemplary case where driving assistance by the driving assistance device 3 is applied to parking assistance of moving the vehicle 1 to a desired position along a teaching path and stopping the vehicle at the position. Accordingly, in the present embodiment, a movement start position when the vehicle 1 is moved along the teaching path, that is, the position of a start point of the teaching path, may be described as a parking start position. Similarly, in the present embodiment, a movement end position when the vehicle 1 is moved along the teaching path, that is, the position of an end point of the teaching path, may be referred to as a parking end position or a parking completion position.

The present embodiment will exemplify a case of driving assistance in which a path reversely tracing a traveling path (teaching traveling path) in the teaching traveling mode is registered as a teaching path. Therefore, in the present embodiment, the movement start position of the teaching traveling, that is, the position of the start point of the teaching traveling path (teaching traveling start position) corresponds to the parking end position of the teaching path (automated traveling end position). Similarly, in the present embodiment, the movement end position of the teaching traveling, that is, the position of the end point of the teaching traveling path (teaching traveling end position) corresponds to the parking start position of the teaching path (automated traveling start position).

In addition, in the present embodiment, tracing the teaching traveling path in reverse may be referred to as reverse reproduction or reversely reproduced traveling. Similarly, in the present embodiment, a path (teaching path) tracing the teaching traveling path in reverse may be referred to as a reversely reproduced path. Similarly, in the present embodiment, the automated traveling mode in which the teaching traveling path is traced in reverse may be referred to as a reversely reproduced traveling mode.

Figure 4:
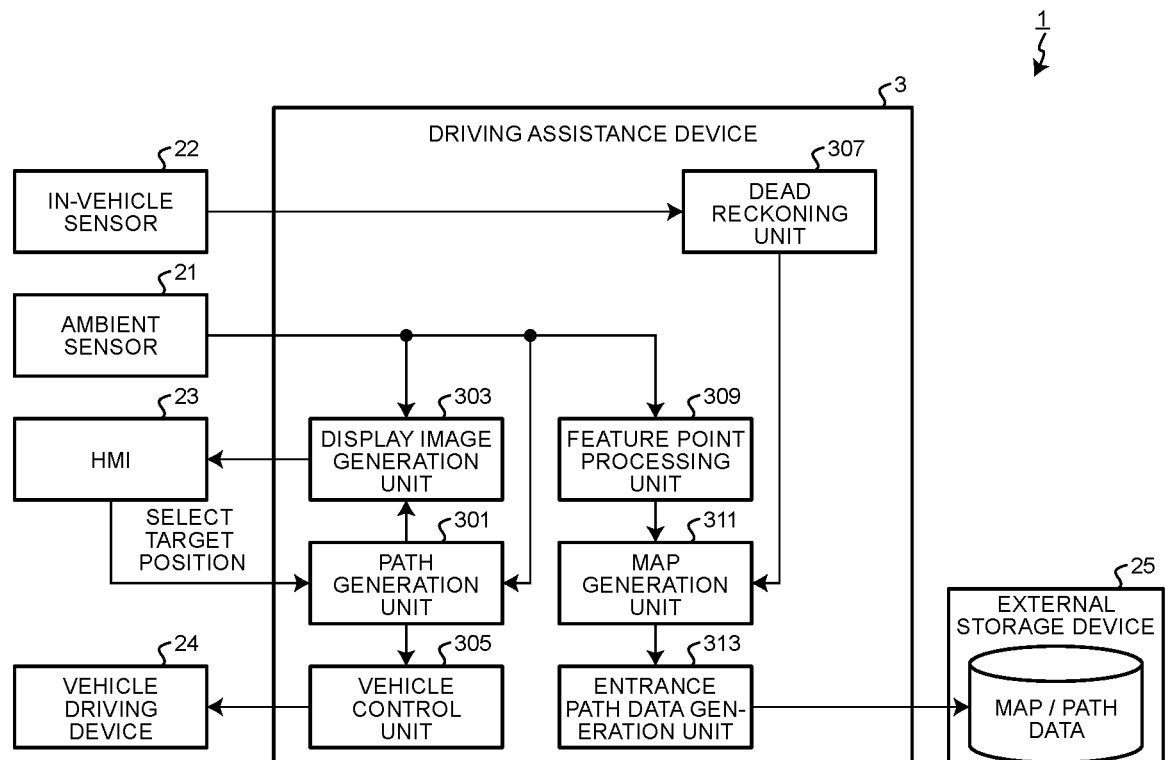
FIG. 4 is a diagram illustrating an example of a functional configuration of the driving assistance device according to the embodiment in a teaching traveling mode.
Figure 5:
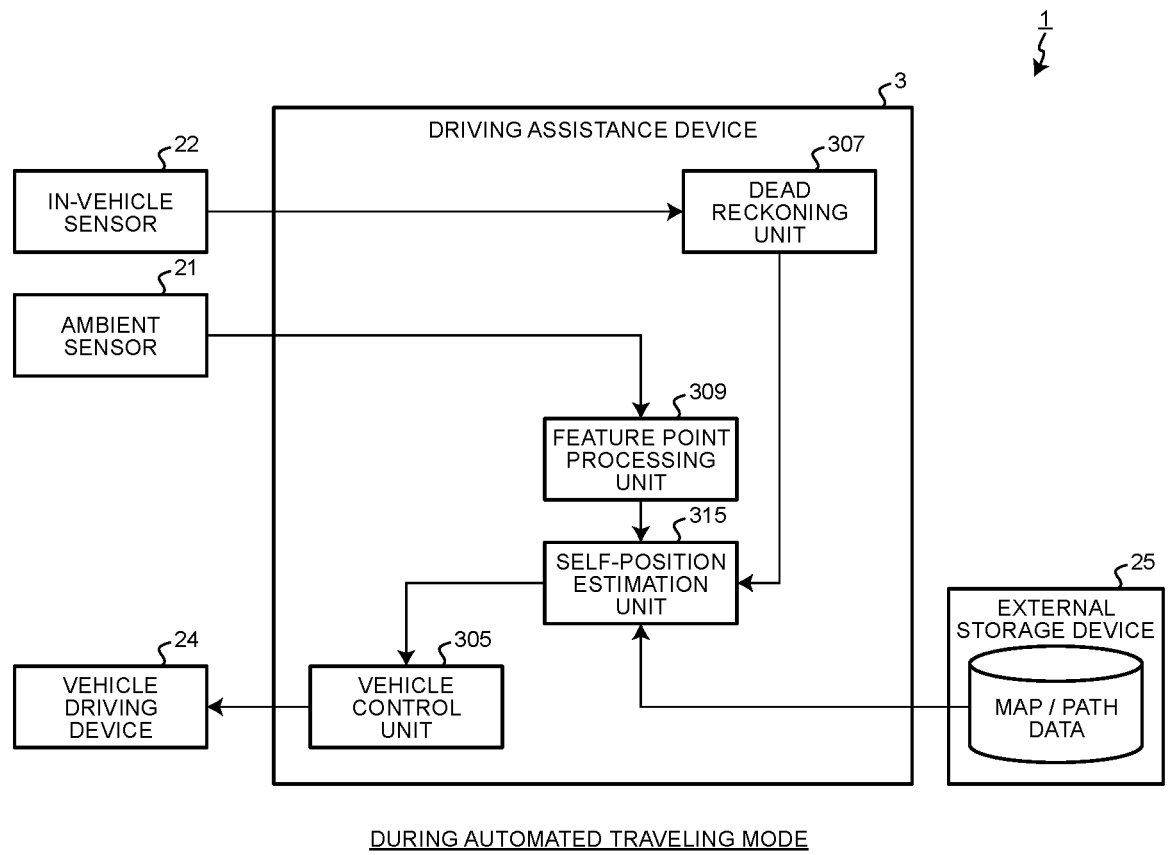
FIG. 5 is a diagram illustrating an example of a functional configuration of the driving assistance device according to the embodiment in an automated traveling mode.

A functional configuration of the driving assistance device 3 according to the embodiment will be described with reference to the drawings. FIGS. 4 and 5 are diagrams each illustrating an example of a functional configuration of the driving assistance device 3 according to the embodiment.

Execution of Teaching Traveling Mode

First, a functional configuration used in the teaching traveling mode will be described. FIG. 4 illustrates functional units that function when the vehicle 1 is in the teaching traveling mode.

In the teaching traveling mode, as illustrated in FIG. 4, the driving assistance device 3 implements functions as a path generation unit 301, a display image generation unit 303, a vehicle control unit 305, a dead reckoning unit 307, a feature point processing unit 309, a map generation unit 311, and an entrance path data generation unit 313.

On the basis of the ambient spatial information at the current position of the vehicle 1 based on the output of the ambient sensor 21 and the information from the HMI 23 indicating the next target position selected by the user, the path generation unit 301 generates, for the next stroke, a traveling path of the vehicle 1 for one stroke from the current position to the target position. The target position is a position connecting two consecutive strokes on the teaching traveling path, and is a redirection position or a parking start position. The target position is an example of a movement destination candidate.

(Generation of Traveling Path Considering Visibility)

Figure 6:
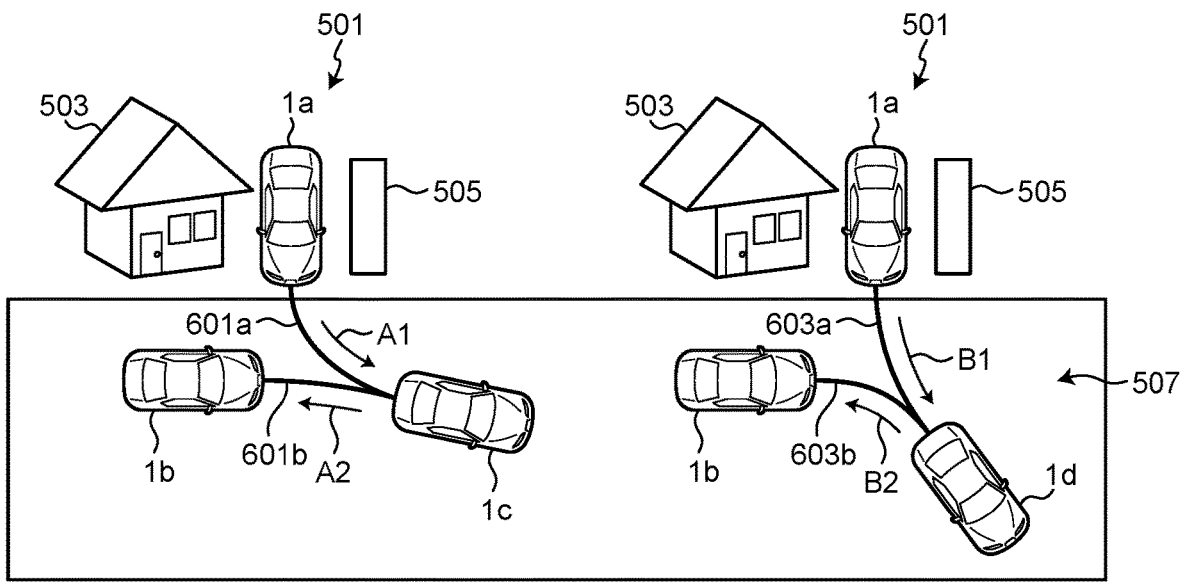
FIG. 6 is a diagram illustrating consideration of visibility in path generation according to the embodiment.

The path generation unit 301 according to the present embodiment is configured to generate a traveling path in consideration of driver's visibility. FIG. 6 is a diagram illustrating consideration of visibility in path generation according to the embodiment.

FIG. 6 illustrates a parking space 501 defined by a building 503 such as a house and by a wall 505, and a traveling space 507 that is adjacent to the parking space 501 and is provided as a space in which the vehicle 1 can travel. In FIG. 6, a vehicle 1a is an example of the vehicle 1, which is the vehicle 1 stopped in the parking space 501 at a teaching traveling start position (parking end position). The teaching traveling start position is an example of start points of teaching traveling paths 601a and 603a of a first stroke. A vehicle 1b is an example of the vehicle 1 at a teaching traveling end position (parking start position). The teaching traveling end position is an example of an end point of teaching traveling paths 601b and 603b of a second stroke, that is, the target position of the stroke starting from an optional redirection position. A vehicle 1c is an example of the vehicle 1 at an optional redirection position in the teaching traveling by the user's driving operation. A vehicle 1d is an example of the vehicle 1 at an optional redirection position in the teaching traveling under the traveling control of the driving assistance device 3 according to the embodiment. The redirection position in FIG. 6 is an example of end points of the teaching traveling paths 601a and 603a of the first stroke, that is, the target position of the first stroke, as well as start points of the teaching traveling paths 601b and 603b of the second stroke.

In a case where the teaching traveling on the assumption of the reverse reproduction is performed by the driving operation of the user, there is an action of user's insight as a desire to ensure the visibility at the time of backward travel. This leads to generation, in the teaching traveling, of a path ensuring the visibility at the time of backward travel in many cases. In this case, the first stroke of traveling forward from the start position to the redirection position (target position) in the teaching traveling often takes a teaching traveling path 601a that turns as indicated by an arrow A1 in FIG. 6, for example. On the other hand, the second stroke of driving from the redirection position to the end position (target position) in the teaching traveling often takes a teaching traveling path 601b that goes backward in a line as close to the straight line as possible as indicated by an arrow A2 in FIG. 6 in order to obtain better visibility at the time of backward travel. In this manner, in a case where the teaching traveling on the assumption of the reverse reproduction is performed by the driving operation of the user, there is a possibility of generating a path that gives the user uncomfortable feeling at the time of reverse reproduction (in the automated traveling mode), such as having a low visibility at the time of backward travel.

In view of the issue above, the path generation unit 301 according to the present embodiment is configured to generate the traveling path of each stroke on the assumption of performing reverse reproduction of the teaching traveling path. Specifically, in the second stroke in which the vehicle travels backward from the redirection position to the end position (target position) of the teaching traveling, the path generation unit 301 can generate the teaching traveling path 603b that turns while the vehicle performs backward travel in the teaching traveling as indicated by an arrow B2 in FIG. 6, for example, in accordance with the positional relationship between the current position and the target position. On the other hand, in the first stroke in which the vehicle travels forward from the start position to the redirection position (target position) in the teaching traveling, the path generation unit 301 generates, as the teaching traveling path 603a, a turning path being as straight as possible, that is, having a large turning radius as indicated by an arrow B1 in FIG. 6, for example, so as to increase the visibility at the time of backward travel in the automated traveling at the time of reverse reproduction.

In this manner, the path generation unit 301 according to the present embodiment is configured to generate a path candidate including a recommended path, in which the turning radius of the stroke of forward travel is larger than the turning radius of the stroke of backward travel regarding the range from the current position to the parking start position in the teaching traveling mode. In other words, the path generation unit 301 is configured to generate the traveling path (teaching traveling path) of each stroke so as to increase the visibility in the backward turning during the reverse reproduction.

(Generation of Traveling Path Considering EPS Performance)

Figure 7:
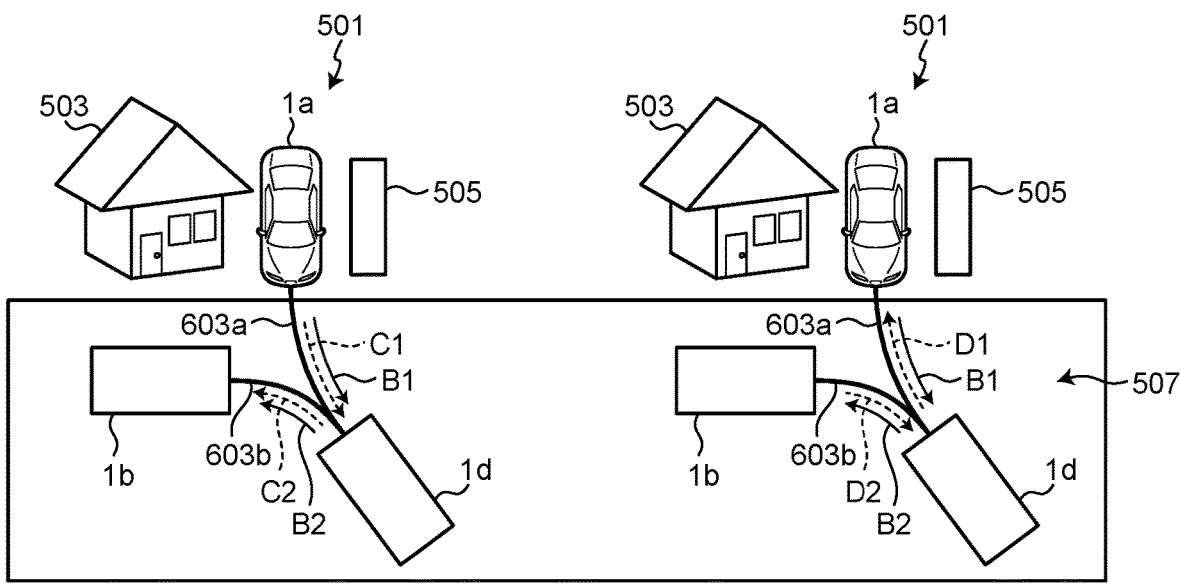
FIG. 7 is a diagram illustrating consideration of electric power steering (EPS) performance in path generation according to the embodiment.

The path generation unit 301 according to the present embodiment is configured to generate a traveling path in consideration of electric power steering (EPS) performance of the vehicle 1. FIG. 7 is a diagram illustrating consideration of EPS performance in path generation according to the embodiment.

In a case where the teaching traveling on the assumption of reverse reproduction is performed by the driving operation of the user, there is a case where the driving operation of the user exceeds the limit of the EPS performance or the like, resulting in generation of a path disregarding the capability (EPS performance) of the EPS. For example, the driving operation of slowly turning the steering wheel as a whole in each stroke can be traced by the EPS in the automated traveling. In contrast, in a case where a driving operation of quickly turning the steering wheel is performed at one place, since the EPS cannot turn the steering wheel as fast as the user, it has been necessary to reduce the vehicle speed when tracing the driving operation in the automated traveling, resulting in strangeness in the overall speed and path in the automated traveling.

Moreover, as illustrated in FIG. 7, the conventional path generation has included, for example, path generation performed in consideration of EPS performance (an arrow C1 in FIG. 7) at the time of forward travel in the first stroke (an arrow B1) of traveling forward from the start position to the redirection position (target position) in the teaching traveling. In addition, as illustrated in FIG. 7, the conventional path generation has included, for example, path generation performed in consideration of EPS performance (an arrow C2) at the time of backward travel in the second stroke (an arrow B2) of moving backward from the redirection position to the end position (target position) in the teaching traveling. However, the EPS has a region where the speed decreases when the steering is further turned as compared with the case where the steering is returned straight, leading to a difference in the maximum capability of EPS between the forward travel and the backward travel. Therefore, the conventional path generation has had a problem of not making the most of the maximum capability (for example, the maximum steering angle) of the EPS.

In view of this, the path generation unit 301 according to the present embodiment is configured to generate the teaching traveling paths 603a and 603b of each stroke in consideration of the difference in the maximum capability of EPS between the forward travel and the backward travel when the automated traveling is executed on the reverse path of the teaching traveling. Specifically, in the first stroke (the arrow B1) of traveling forward from the start position to the redirection position (target position) in the teaching traveling, the path generation unit 301 generates the teaching traveling path 603a in consideration of EPS performance (an arrow D1) at the time of backward travel. Similarly, in the second stroke (the arrow B2) of traveling backward from the redirection position to the end position (target position) in the teaching traveling, the path generation unit 301 generates the teaching traveling path 603b in consideration of EPS performance (an arrow D2) at the time of forward travel.

In this manner, the path generation unit 301 according to the present embodiment is configured to generate, in the teaching traveling mode, at least one path candidate for the vehicle 1 including a recommended path on the basis of the performance of the vehicle 1 at the time of backward travel for the stroke of forward travel and on the basis of the performance of the vehicle 1 at the time of forward travel for the stroke of backward travel. The performance of the vehicle 1 is the maximum capability regarding the rotation range or the rotation speed of the EPS of the vehicle 1, for example. In other words, the path generation unit 301 is configured to generate the path of each stroke in the teaching traveling mode in consideration of the EPS performance such as turning and returning the steering wheel during the reversely reproduced travel (in the automated traveling mode).

The display image generation unit 303 generates display information to be displayed by the HMI 23. For example, the display image generation unit 303 generates display information for displaying a screen for selecting a parking start position and a screen for selecting a target position regarding each stroke in the teaching traveling.

Figure 8:
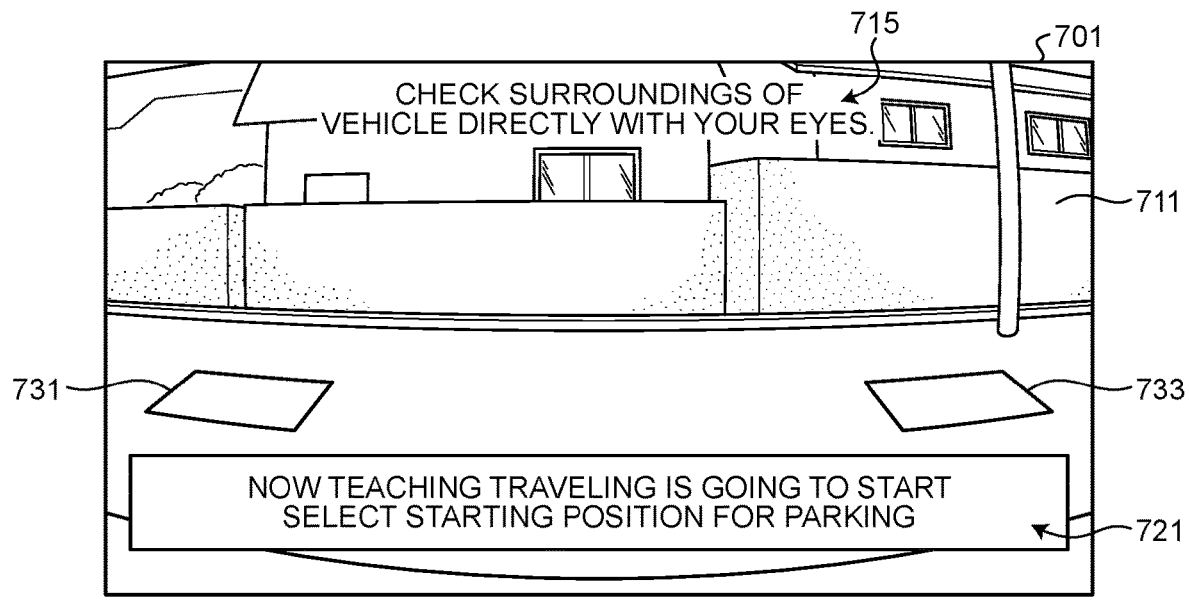
FIG. 8 is a diagram illustrating an example of a display screen displayed in an assistance process according to the embodiment.

In one example, when the teaching traveling mode is started, the display image generation unit 303 generates display information for displaying a screen related to designation of the parking start position, and outputs the generated display information to the HMI 23. An example of the case where the teaching traveling mode is started is a case where an output of the HMI 23 in accordance with the user operation giving an instruction on the start of the teaching traveling mode has been acquired. FIG. 8 is a diagram illustrating an example of a display screen 701 displayed in an assistance process according to the embodiment. The display screen 701 is an example of a screen related to the designation of the parking start position. The display screen 701 is displayed on the vehicle 1a illustrated in FIGS. 6 and 7, for example.

As illustrated in FIGS. 6 and 7, for example, the vehicle 1 is assumed to be parked in the parking space 501 with a front end F thereof facing the traveling space 507. That is, description will be given here using an exemplary case where the vehicle 1 is controlled to perform forward travel on the teaching traveling path of the first stroke, that is, a case of generating a teaching path for controlling the vehicle 1 to perform backward travel in the last one stroke to stop at the parking completion position in the parking space 501.

For example, the display screen 701 displays message information items 715 and 721 and candidates 731 and 733 for parking start position so as to be superimposed on an ambient image 711 (for example, a front image) of the vehicle 1 obtained by the surround view camera 212 at the current position (teaching traveling start position). For example, the message information item 715 indicates information for raise awareness regarding teaching traveling, and an example of this is a message such as "Check the surroundings of the vehicle directly with your eyes." For example, the message information item 721 indicates information for prompting the user to select from the candidates 731 and 733 for the parking start position, and an example of this is a message "Now teaching traveling is going to start. Select a starting position for parking". For example, the candidates 731 and 733 for the parking start position is information for presenting, to the user, candidates for a position (a position of the vehicle 1b in FIGS. 6 and 7) for starting automated traveling for parking the vehicle 1 at the current position. The candidates 731 and 733 for the parking start position are an example of candidates for the automated traveling start position.

There may be a display mode in which the candidates 731 and 733 for the parking start position are not displayed. In this case, a position designated by the user in the ambient image of the vehicle 1 may be acquired as a candidate for the parking start position. Moreover, there may be a mode in which, in a case where a parking start position is designated by the user, display of the designated position is started.

Figure 9:
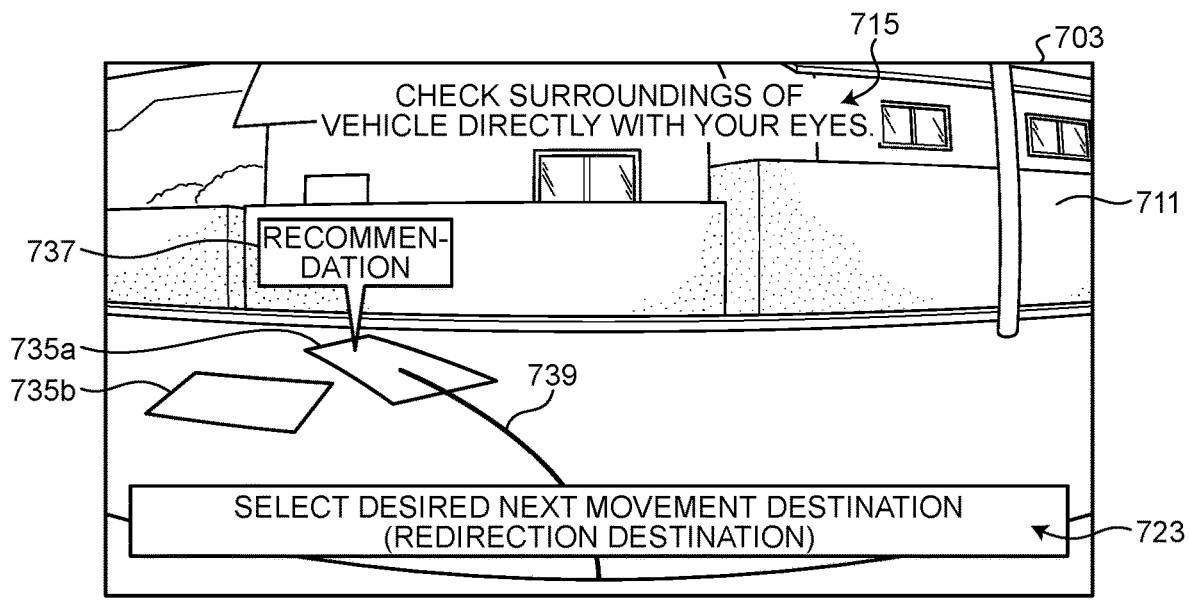
FIG. 9 is a diagram illustrating an example of a display screen displayed in the assistance process according to the embodiment.

In one example, the display image generation unit 303 is configured to output display information for displaying a display screen including a recommended path in the teaching traveling mode. For example, after one of the candidates 731 and 733 for the parking start position is selected, the display image generation unit 303 generates display information for displaying a screen related to designation of a target position reached in one stroke from the current position in the teaching traveling, that is, a redirection position, and outputs the generated display information to the HMI 23. FIG. 9 is a diagram illustrating an example of a display screen 703 displayed in an assistance process according to the embodiment. The display screen 703 is an example of a screen related to designation of the redirection position. The display screen 703 is displayed on the vehicle 1a illustrated in FIGS. 6 and 7, for example. FIG. 9 illustrates a case where the candidate 733 for the parking start position is selected on the display screen 701 of FIG. 8.

For example, the display screen 703 displays the message information items 715 and 723 and candidates 735a and 735b for the redirection position so as to be superimposed on the ambient image 711. For example, the message information item 723 indicates information for prompting the user to select form the candidates 735a and 735b for the redirection position, and an example of this is a message such as "Select a desired next movement destination (redirection destination)". For example, the candidates 735a and 735b for the redirection position indicate information for presenting, to the user, candidates for a target position (the position of the vehicle 1d in FIGS. 6 and 7) of moving from the current position in one stroke during the teaching traveling.

In addition, for example, the display screen 703 further includes: a display of a recommendation icon 737 indicating a recommended candidate among the candidates 735a and 735b for the redirection position; and a display of a recommended path 739 to a candidate for the redirection position corresponding to the recommendation icon 737. The candidate for the redirection position recommended to the user by the recommendation icon 737 and the recommended path 739 are determined by the path generation unit 301 in consideration of the visibility and the EPS performance as described above. There can be a display mode in which either one of the recommendation icon 737 or the recommended path 739 is not included in the display screen 703.

The display screen 703 in FIG. 9 exemplifies a screen related to designation of the redirection position displayed on the vehicle 1a at the teaching traveling start position, while similar screens can be displayed at each redirection position except for the redirection position at which the vehicle 1a can reach the parking start position in one stroke.

Figure 10:
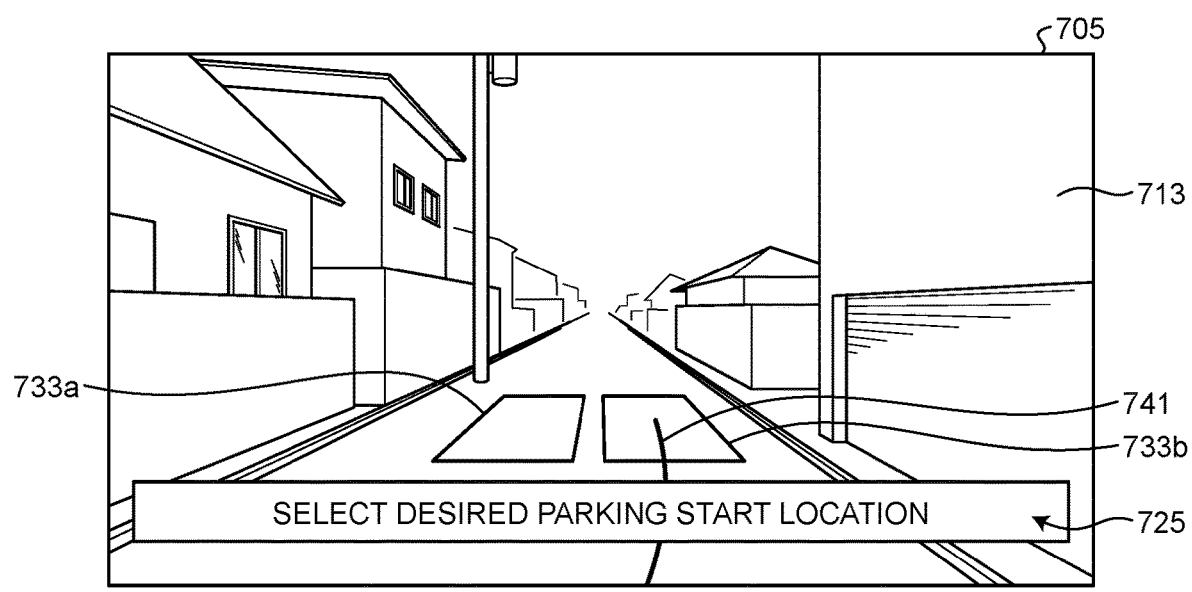
FIG. 10 is a diagram illustrating an example of a display screen displayed in an assistance process according to the embodiment.

Moreover, when the vehicle 1 has moved to the redirection position where the vehicle 1 can reach the parking start position in one stroke, for example, the display image generation unit 303 generates display information for displaying a screen related to the designation of the parking start position, and outputs the generated display information to the HMI 23. FIG. 10 is a diagram illustrating an example of a display screen 705 displayed in the assistance process according to the embodiment. The display screen 705 is an example of a screen related to the designation of the parking start position. The display screen 705 is displayed on the vehicle 1d illustrated in FIGS. 6 and 7, for example. FIG. 10 illustrates a case where one of the candidates 735a and 735b for the redirection position is selected on the display screen 703 in FIG. 9.

For example, the display screen 705 displays a message information item 725 and candidates 733a and 733b for the parking start position so as to be superimposed on an ambient image 713 (for example, the rear image) of the vehicle 1 obtained by the surround view camera 212 at the current position (for example, the candidate 735a for the redirection position). For example, the message information item 725 is information for prompting the user to select from the candidates 733a and 733b for the parking start position, and an example of this is a message such as "Select a desired parking start location". For example, the candidates 733a and 733b for the parking start position are positions corresponding to the candidate 733 for the parking start position selected on the display screen 701 of FIG. 8. For example, the candidates 733a and 733b for the parking start position indicate information for presenting, to the user, candidates for a target position (the position of the vehicle 1b in FIGS. 6 and 7) of moving from the current position in one stroke during the teaching traveling.

Moreover, for example, the display screen 705 further includes a display of a recommended path 741 to a recommended candidate among the candidates 733a and 733b for the parking start position. As described above, the recommended path 741 is determined by the path generation unit 301 in consideration of visibility and EPS performance. In addition to or instead of displaying the recommended path 741, a recommendation icon indicating a recommended candidate among the candidates 733a and 733b for the parking start position may be displayed.

The message information items 715, 721, 723, and 725 are not limited to the presentation by the display, and may be presented to the user by voice with no display on the screen.

An image in the traveling direction of the vehicle 1 in the next stroke is used as the ambient images 711 and 713, whereas the image is not limited thereto. The ambient images 711 and 713 may be implemented by using, for example, an overhead image (surround view image) of the vehicle 1 generated by combining images of ambient images (for example, front, rear, left, and right images) of the vehicle 1 obtained by the surround view camera 212.

The display of the candidates 731, 733, 733a, and 733b for the parking start position and the candidates 735a and 735b for the redirection position may be displayed together with input elements such as a slider, a dial, and a numerical value input field so as to be able to correct the positions or orientations of these positions. That is, the parking start position and the redirection position may be designated by moving or rotating a display such as a frame on the touch panel, or may be designated by an operation on a display of an input element displayed on the touch panel. In addition, the display of the candidates 731, 733, 733a and 733b for the parking start position and the candidates 735a and 735b for the redirection position is not limited to the example of FIGS. 8 to 10, that is, the display is not limited to the display of the frame, and may be a CG image or an icon of the host vehicle. Alternatively, the display mode, a color, a line type, transparency, or the like may be varied between the candidates or specifically for the currently selected candidate.

In the teaching traveling mode, the vehicle control unit 305 causes the vehicle 1 to travel along the path candidate from the current position to the movement destination candidate selected by the user among at least one movement destination candidate (target position). Specifically, when the selection of the target position related to each stroke has been received by the HMI 23, the vehicle control unit 305 causes the vehicle 1 to move along the traveling path related to each stroke generated by the path generation unit 301. Specifically, the vehicle control unit 305 controls steering, braking, and acceleration/deceleration of the vehicle 1 so as to follow the traveling path for each stroke. In one example, on the basis of the traveling path for each stroke and the position and direction of the vehicle 1 estimated by the dead reckoning unit 307, the vehicle control unit 305 detects a difference between the traveling path for each stroke and the position/direction of the vehicle 1. The vehicle control unit 305 controls at least one of control amounts of steering, braking, and acceleration/deceleration of the vehicle 1 so as to reduce the detected difference, thereby controlling the vehicle 1 to follow the traveling path for each stroke to achieve control of automated traveling in the teaching traveling mode.

Note that the vehicle control unit 305 may perform traveling control of controlling the vehicle 1 to travel in accordance with the driving operation of the user in the teaching traveling mode.

The dead reckoning unit 307, the feature point processing unit 309, the map generation unit 311, and the entrance path data generation unit 313 are examples of the teaching data generation unit. The teaching data generation unit is configured to store the teaching traveling path of the time when the vehicle travels from the current position to the automated traveling start position designated by the user in the teaching traveling mode. Moreover, in the teaching traveling mode, the teaching data generation unit generates teaching data related to a teaching path obtained by reversing the teaching traveling path in a manner of being directed from the end point toward the start point.

The dead reckoning unit 307 estimates the current position of the vehicle 1 on the basis of a temporal change in the sensor value of the in-vehicle sensor 22 that detects the traveling state of the vehicle 1. For example, the dead reckoning unit 307 calculates the amount of movement of the vehicle 1 from the reference position (For example, the traveling start position when the teaching traveling mode is started) on the basis of temporal changes in the vehicle speed and the steering angle or the yaw rate indicated by the in-vehicle sensor 22, and estimates the current position of the vehicle 1 on the basis of the calculated amount of movement.

For example, the feature point processing unit 309 extracts feature points from each of the captured images on front, rear, left, and right sides of the vehicle 1, that is, a surrounding image. The features of the feature point may be determined by appropriately using features such as Scale Invariant Feature Transform (SIFT) feature, Speeded Up Robust Features (SURF) in addition to the luminance and density on the camera image. Note that the method of extracting feature points is not particularly limited, and a known method may be applied. For example, the feature point processing unit 309 extracts feature points from the surrounding image by a method such as Features from Accelerated Segment Test (FAST) or Oriented FAST and Rotated BRIEF (ORB).

Map generation unit 311 acquires a surrounding environment map defining an ambient environment of the vehicle 1, that is, a surrounding environment being a space expanding along a traveling path of the vehicle 1, as a map. The map generation unit 311 defines the ambient environment of the vehicle 1 on the basis of the feature points extracted by the feature point processing unit 309 and the current position of the vehicle 1 estimated by the dead reckoning unit 307, thereby acquiring a surrounding environment map. The surrounding environment map is, for example, data associating the three-dimensional position of each of feature points in the ambient space with the feature of the feature point obtained from the surrounding image. For example, the map generation unit 311 generates a surrounding environment map (local map) by detecting coordinates indicating the position of each feature point using a simultaneous localization and mapping (SLAM) technology for the feature point extracted by the feature point processing unit 309.

Note that the surrounding environment map may be defined by spatial information based on the output of the sonar 211 in addition to spatial information based on the captured image, or may be measured in advance using LiDAR or a stereo camera.

The entrance path data generation unit 313 stores a traveling path (teaching traveling path) in the teaching traveling mode, and generates entrance path data from the teaching traveling path as teaching data related to a target path when the vehicle 1 is controlled to perform automated traveling in the automated traveling mode. The entrance path data generation unit 313 starts storage of the teaching traveling path triggered by reception of a teaching traveling mode start instruction from the user by the HMI 23, for example. The entrance path data generation unit 313 ends the storage of the teaching traveling path triggered by reception of a teaching traveling mode end instruction from the user by the HMI 23, for example. Typically, the entrance path data generation unit 313 starts the storage of the teaching traveling path from a state in which the vehicle 1 stops at the parking end position (the position of the vehicle 1*a*), and ends the storage of the teaching traveling path in a state in which the vehicle 1 stops at a desired position (the position of the vehicle 1*b*) outside the parking space 501.

In the teaching traveling, the entrance path data generation unit 313 detects the teaching traveling path of the vehicle 1 on the basis of a self-position estimation result detected by the SLAM technique and the dead reckoning technique, for example. In detection of the teaching traveling path, the traveling path is represented by a set of points (waypoints) existing at substantially equidistant intervals, and each point is detected as path point cloud data that holds coordinates indicating a position, an azimuth indicating orientation of the vehicle 1 at the position, and a traveling speed, as parameters. In addition, the entrance path data generation unit 313 generates the entrance path data by reversing the detected teaching traveling path so as to be directed from the end point toward the start point. The entrance path data generated by the entrance path data generation unit 313 is stored in the external storage device 25 together with the surrounding environment map generated by the map generation unit 311.

Execution of Automated Traveling Mode

Next, a functional configuration in the automated traveling mode will be described. FIG. 5 illustrates functional units that function when the vehicle 1 is in the automated traveling mode.

In the automated traveling mode, as illustrated in FIG. 5, the driving assistance device 3 implements functions as the vehicle control unit 305, the dead reckoning unit 307, the feature point processing unit 309, and a self-position estimation unit 315.

The vehicle control unit 305 causes the vehicle 1 to travel along the teaching path in the automated traveling mode. Specifically, when the execution instruction of the automated traveling mode from the user has been received by the HMI 23, the vehicle control unit 305 causes the vehicle 1 to move along the teaching path (target path) on the basis of the entrance path data and the surrounding environment map read from the external storage device 25. Specifically, the vehicle control unit 305 controls steering, braking, and acceleration/deceleration of the vehicle 1 for following the teaching path. In one example, on the basis of the teaching path and the position and direction of the vehicle 1 estimated by the self-position estimation unit 315, the vehicle control unit 305 detects a difference between the teaching path and the position/direction of the vehicle 1. The vehicle control unit 305 controls at least one of control amounts of steering, braking, and acceleration/deceleration of the vehicle 1 so as to reduce the detected difference, thereby controlling the vehicle 1 to follow the teaching path to achieve control of automated traveling in the automated traveling mode.

The dead reckoning unit 307 and the feature point processing unit 309 have the configurations similar to those in the teaching traveling mode, so that the description thereof will be omitted here.

The self-position estimation unit 315 estimates the position and orientation of the vehicle 1 when the vehicle 1 performs the reproduced traveling based on the teaching path by the vehicle control unit 305. In one example, the self-position estimation unit 315 estimates the position and orientation of the vehicle 1 by reading the feature point information of the surrounding environment map read from the external storage device 25, and comparing the feature point information with the feature point extracted from the current surrounding image acquired by the ambient sensor 21 in the reproduced traveling.

Note that the position and orientation of the vehicle 1 estimated by the self-position estimation unit 315 may each be a relative position and a relative direction with respect to a reference position and a reference direction such as a start position and a start direction in the acquired traveling path, or may be an absolute position and an absolute direction based on outputs of an azimuth sensor and a GNSS sensor.

Next, a procedure of the assistance process executed by the driving assistance device 3 configured as described above will be described. As described above, the assistance process executed by the driving assistance device 3 includes a teaching traveling process of implementing the teaching traveling mode and an automated traveling process of implementing the automated traveling mode.

FIG. 11 is a flowchart illustrating an example of a procedure of the assistance process (teaching traveling process) in the teaching traveling mode executed by the driving assistance device 3 according to the embodiment. The procedure illustrated in FIG. 11 is started, for example, in a state where the vehicle 1 is stopped at the parking end position of the parking space 501, that is, in a case where a teaching traveling mode start instruction is issued by the user in the vehicle 1*a* of FIGS. 6 and 7.

The driving assistance device 3 recognizes a free space in front of the vehicle 1 on the basis of the output of the ambient sensor 21, and displays the candidates 731 and 733 for the parking start position by the HMI 23 (S101).

The driving assistance device 3 generates two or more automated traveling paths related to the range between the current position and the candidate for the parking start position (for example, the candidate 733 for the parking start position) selected by the driver. Moreover, the driving assistance device 3 displays the candidates for the automated traveling path including the recommended path 739, for example, the candidates 735*a* and 735*b* for the redirection position and the recommendation icon 737 by the HMI 23 (S102).

The driving assistance device 3 performs automated traveling for one stroke from the current position to the redirection position selected by the driver (for example, the redirection position candidate 735*a*), and records an ambient environment map on the basis of feature points (S103).

The driving assistance device 3 determines whether the next path is a path of one stroke to the candidate for the parking start position (for example, the candidate 733 for the parking start position) (S104).

When the next path is not a path of one stroke to the candidate for the parking start position (S104: No), that is, when the next stroke is not a stroke with which the vehicle can reach the automated traveling start position in one stroke, the procedure illustrated in FIG. 11 returns to the process of S102.

On the other hand, when the next path is a path for one stroke to the candidate for the parking start position (S104: Yes), the driving assistance device 3 displays, by using the HMI 23, the candidates 733*a* and 733*b* for the parking start position that can be set (S105).

The driving assistance device 3 performs automated traveling for one stroke from the current position to the parking start position (for example, the candidate 733*b* for the parking start position) selected by the driver, and records the ambient environment map on the basis of the feature point (S106).

The driving assistance device 3 records, as teaching data, a target path and a surrounding environment map, regarding reverse tracing of a moving path from the teaching traveling start position (the position of the vehicle 1*a*) to the parking start position (the position of the vehicle 1*b*) (S107). Thereafter, the procedure illustrated in FIG. 11 ends.

FIG. 12 is a flowchart illustrating an example of a procedure of the assistance process (automated traveling process) in the automated traveling mode executed by the driving assistance device 3 according to the embodiment. The procedure illustrated in FIG. 12 is started, for example, in a state where the vehicle 1 is stopped at or in the vicinity of the parking start position of the traveling space 507, that is, in a case where an automated traveling mode start instruction is issued by the user in the vehicle 1*b* of FIGS. 6 and 7.

The driving assistance device 3 reads teaching data (entrance path data and surrounding environment map) from the external storage device 25 (S201). Moreover, the driving assistance device 3 estimates the host vehicle position (S202). In addition, the driving assistance device 3 implements feedback control of the vehicle 1 so as to go along the target path of the teaching data (S203). The driving assistance device 3 may generate a merging path that merges with the target path of the teaching data from the position at the start of the automated traveling mode, and may perform feedback control of the vehicle 1 so as to go along the merging path until merging with the target path. When the vehicle 1 has not reached the parking completion position (S204: No), the driving assistance device 3 repeats the processes of S202 and S203. In contrast, when the vehicle 1 has reached the parking completion position (S204: Yes), the procedure illustrated in FIG. 12 ends.

Conventionally, when parking the vehicle 1 in a parking lot such as a home parking lot, unlike parking in a general parking lot, there has been a known problem that it is difficult for the driver of the vehicle 1 to determine a position to stop the vehicle 1. For solving this problem, there is known a technique related to driving assistance using a registered home parking application that stores characteristic objects and a parking path around a home from start of parking to completion of parking at the time of parking operation by a driver and reproduces the path at the time of parking operation by the driver while confirming consistency of the ambient characteristics at the time of automated traveling.

There is another problem that, when the vehicle performs redirection operation many times to find a satisfactory stop position at the time of parking operation by the driver, the vehicle 1 would move following the redirection operation during the reproduction of the parking at home. To handle this, there is known a technique related to driving assistance by a registered home parking application that stores a traveling path of the vehicle 1 by the user as a teaching path in the teaching traveling mode and reversely reproduces the traveling path during the teaching traveling to move the vehicle 1 to a parking completion position and park the vehicle 1 in the automated traveling mode.

However, the reproduced traveling based on the reversely reproduced path (teaching path), in which the moving path during the teaching traveling is traced in reverse, might be strange traveling due to the fact that the traveling direction of the vehicle is different from the direction of the teaching traveling.

For example, at the time of a parking operation by a driver, there is an action of user's insight as a desire to ensure the visibility at the time of backward travel. This leads to the choice of turning at the time of forward travel and moving straight as much as possible at the time of backward travel in many cases. For this reason, the path at the time of the parking operation by the driver might be generated, in some cases, as a path giving a feeling of strangeness when the path is reversely reproduced.

Considering such circumstances, the driving assistance device 3 according to the embodiment is configured to generate a recommended path for the teaching traveling on the assumption that the teaching traveling path is to be reversely reproduced. For example, the driving assistance device 3 generates, as the recommended path 739, a path having a large turning radius in consideration of the visibility to the parking space 501 at the time of backward travel. According to this configuration, it is possible to reduce strangeness of traveling, such as occurrence of unnecessary deceleration to drive along the teaching path, regarding the reproduced traveling based on the teaching path in which the moving path during the teaching traveling is reversed. Therefore, the driving assistance device 3 according to the embodiment appropriately assists the reproduced traveling based on the reversely reproduced path.

For example, when a driver performs a parking operation, there has been a case of performing teaching traveling exceeding the capability (for example, EPS performance) of the vehicle 1 at the time of automated parking. For example, in a case where the driver performs a driving operation of turning the steering wheel full (dry steering), there is no margin for correction (error correction margin) at the time of reproduction, leading to the possibility of occurrence of strange traveling at the time of reproduction. In addition, for example, when the steering operation is quickly performed by the driver beyond the EPS performance, this leads to occurrence of strange automated parking at the time of reproduction, such as a failure in reproduction of steering operation at the time of teaching traveling due to insufficient rotational torque of the steering.

Under such circumstances, the driving assistance device 3 according to the embodiment is configured to generate the recommended path in the teaching traveling in consideration of the difference in EPS maximum capability between the forward travel and the backward travel. For example, regarding the stroke of forward travel, the driving assistance device 3 generates a recommended path in consideration of the EPS performance at the time of backward travel. Similarly, regarding the stroke of backward travel, the driving assistance device 3 generates a recommended path in consideration of the EPS performance at the time of forward travel. This configuration can suppress the teaching traveling exceeding the maximum capability (for example, EPS performance) of the vehicle 1 at the time of automated parking, making it possible to reduce the strangeness of traveling.

In addition, the driving assistance device 3 according to the embodiment presents a recommended path of each stroke in consideration of conditions such as visibility and EPS performance to the driver, and executes a teaching traveling mode of performing automated traveling on a candidate path of each stroke selected by the user. With this configuration, regarding the visibility and the EPS performance, it is possible to suppress the occurrence of strangeness of traveling caused by the parking operation by the driver.

The above-described embodiment is an exemplary case where path generation is performed in consideration of both the visibility and EPS performance, whereas the configuration is not limited thereto. The driving assistance device 3 may be configured to perform path generation in consideration of either visibility or EPS performance.

The above embodiment uses the EPS performance in one example of the capability of the vehicle 1 during automated parking, whereas the application is not limited thereto. The maximum capability of the vehicle 1 during automated parking to be considered in path generation may be any capability that causes a difference in maximum capability (performance) between forward travel and backward travel, and application is also possible to other capability (performance) such as acceleration/deceleration and braking.

The above-described embodiment is an exemplary case of the driving assistance device 3 using a mode of application to automated parking of the vehicle 1 in the parking space 501, whereas the application is not limited thereto. The driving assistance device 3 according to the present disclosure may be applied to an application of automated exit of the vehicle 1 from the parking space 501, for example. That is, the teaching traveling mode according to the above-described embodiment may be a mode for registering a target path (teaching path) of parking the vehicle 1 in the parking space 501 or exiting from the parking space 501 in the automated traveling mode.

In the above embodiment, "determining whether it is A" may be "determining that it is A", "determining that it is not A", or "determining whether it is A or not".

The computer program executed by the driving assistance device 3 of the above-described embodiment is provided by being recorded in a computer-readable recording medium such as a CD-ROM, an FD, a CD-R, or a DVD as a file in an installable format or an executable format.

Moreover, the programs executed on the driving assistance device 3 in the above embodiment may be stored on a computer connected to a network such as the Internet and be provided by downloading via the network. Moreover, the programs executed on the driving assistance device 3 may be provided or distributed via a network such as the Internet.

In addition, the programs to be executed by the driving assistance device 3 of the above-described embodiment may be provided by being incorporated beforehand in a medium such as ROM.

In addition, the program used for implementing the teaching traveling mode executed by the driving assistance device 3 of the above-described embodiment has a module configuration including the above-described respective functional units (the path generation unit 301, the display image generation unit 303, the vehicle control unit 305, the dead reckoning unit 307, the feature point processing unit 309, the map generation unit 311, and the entrance path data generation unit 313). As actual hardware, the CPU 31 reads and executes the program from the ROM 32 or the HDD 34, whereby the respective functional units are loaded onto the RAM 33, and the individual functional units are generated on the RAM 33.

In addition, the program used for implementing the automated traveling mode executed by the driving assistance device 3 of the above-described embodiment has a module configuration, which includes the above-described individual functional units (the vehicle control unit 305, the dead reckoning unit 307, the feature point processing unit 309, and the self-position estimation unit 315). As actual hardware, the CPU 31 reads and executes the program from the ROM 32 or the HDD 34, whereby the individual functional units are loaded onto the RAM 33, and the functional units are generated on the RAM 33.

The program executed by the driving assistance device 3 of the above-described embodiment, specifically, the program used for implementing the teaching traveling mode and the program used for implementing the automated traveling mode, may be a single program or two or more programs.

According to at least one embodiment described above, it is possible to appropriately assist reproduced traveling based on the reversely reproduced path.

While certain embodiments have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

Supplementary Notes

The description of the embodiment described above discloses the technique described below.

(Supplementary Note 1)

A driving assistance device comprising a hardware processor connected to a memory and configured to:
  perform processing in a teaching traveling mode, the processing including
    storing a teaching traveling path in the memory, the teaching traveling path being obtained by a vehicle traveling from a current position to an automated traveling start position designated by a user, and
    generating teaching data related to a teaching path, the teaching path being obtained by reversing the teaching traveling path in a manner of being directed from an end point toward a start point;
  cause the vehicle to travel along the teaching path in an automated traveling mode;
  generate, in the teaching traveling mode, a recommended path in which a turning radius of a stroke of forward travel is larger than a turning radius of a stroke of backward travel in a range from the current position to the automated traveling start position; and
  output, in the teaching traveling mode, display information for displaying a display screen including the recommended path.

(Supplementary Note 2)

The driving assistance device according to the supplementary note 1, wherein the hardware processor generates one or more path candidates for the vehicle including the recommended path, the path candidate being generated on the basis of performance of the vehicle at a time of backward travel of the vehicle for a stroke of the forward travel and on the basis of performance of the vehicle at a time of forward travel of the vehicle for a stroke of the backward travel.

(Supplementary Note 3)

The driving assistance device according to the supplementary note 2, wherein the performance of the vehicle is maximum capability related to a rotation range or a rotation speed of an electric power steering of the vehicle.

(Supplementary Note 4)

The driving assistance device according to any one of the supplementary notes 1 to 3, wherein, when an instruction on a start of the teaching traveling mode is given by a user, the hardware processor outputs display information for displaying one or more candidates for the automated traveling start position in a manner of being superimposed on an ambient image of the vehicle.

(Supplementary Note 5)

The driving assistance device according to any one of the supplementary notes 1 to 4, wherein the hardware processor
  generates, for a next stroke, one or more movement destination candidates including a position corresponding to the recommended path and one or more path candidates for the one or more movement destination candidates including the recommended path, and
  outputs display information for displaying at least the one or more movement destination candidates out of the one or more movement destination candidates and the one or more path candidates, the one or more movement destination candidates to be displayed by the display information being superimposed on an ambient image of the vehicle.

(Supplementary Note 6)

The driving assistance device according to the supplementary note 5, wherein the hardware processor causes the vehicle, in the teaching traveling mode, to travel along the path candidate from a current position to a movement destination candidate selected by a user from among the one or more movement destination candidates.

(Supplementary Note 7)

The driving assistance device according to the supplementary note 6, wherein, in a case where the next stroke is not a stroke capable of reaching the automated traveling start position in one stroke, the hardware processor
  outputs the display information for displaying, as the movement destination candidate, a candidate for a redirection position of the vehicle in a manner of being superimposed on an ambient image of the vehicle, and
  outputs the display information related to a following next stroke after the vehicle is caused to travel to the movement destination candidate selected by the user.

(Supplementary Note 8)

The driving assistance device according to the supplementary note 5, wherein the hardware processor causes the vehicle, in the teaching traveling mode, to travel from a current position to a movement destination candidate selected by the user from among the one or more movement destination candidates in accordance with a driving operation of the user.

(Supplementary Note 9)

The driving assistance device according to any one of the supplementary notes 1 to 8, wherein the teaching traveling mode is a mode for registering a target path of parking of the vehicle in a parking space or exiting from the parking space in the automated traveling mode.

(Supplementary Note 10)

The driving assistance device according to any one of the supplementary notes 1 to 9, further comprising a display device disposed to be visually recognizable by the user, the display device being configured to display the display screen on the basis of the display information output from the hardware processor.

(Supplementary Note 11)

A driving assistance method comprising:
  performing processing in a teaching traveling mode, the processing including
    storing a teaching traveling path in the memory, the teaching traveling path being obtained by a vehicle traveling from a current position to an automated traveling start position designated by a user, and
    generating teaching data related to a teaching path, the teaching path being obtained by reversing the teaching traveling path in a manner of being directed from an end point toward a start point;

causing the vehicle to travel along the teaching path in an automated traveling mode;

generating, in the teaching traveling mode, a recommended path in which a turning radius of a stroke of forward travel is larger than a turning radius of a stroke of backward travel in a range from the current position to the automated traveling start position; and outputting, in the teaching traveling mode, display information for displaying a display screen including the recommended path.

(Supplementary Note 12)

The driving assistance method according to the supplementary note 11, further comprising generating one or more path candidates for the vehicle including the recommended path, the path candidate being generated on the basis of performance of the vehicle at a time of backward travel of the vehicle for a stroke of the forward travel and on the basis of performance of the vehicle at a time of forward travel of the vehicle for a stroke of the backward travel.

(Supplementary Note 13)

The driving assistance method according to the supplementary note 12, wherein the performance of the vehicle is maximum capability related to a rotation range or a rotation speed of an electric power steering of the vehicle.

(Supplementary Note 14)

The driving assistance method according to any one of the supplementary notes 11 to 13, further comprising, when an instruction on a start of the teaching traveling mode is given by a user, outputting display information for displaying one or more candidates for the automated traveling start position in a manner of being superimposed on an ambient image of the vehicle.

(Supplementary Note 15)

The driving assistance method according to any one of the supplementary notes 11 to 14, further comprising:

generating, for a next stroke, one or more movement destination candidates including a position corresponding to the recommended path and one or more path candidates for the one or more movement destination candidates including the recommended path, and outputting display information for displaying at least the one or more movement destination candidates out of the one or more movement destination candidates and the one or more path candidates, the one or more movement destination candidates to be displayed by the display information being superimposed on an ambient image of the vehicle.

(Supplementary Note 16)

The driving assistance method according to the supplementary note 15, further comprising causing the vehicle, in the teaching traveling mode, to travel along the path candidate from a current position to a movement destination candidate selected by a user from among the one or more movement destination candidates.

(Supplementary Note 17)

The driving assistance method according to the supplementary note 16, further comprising, in a case where the next stroke is not a stroke capable of reaching the automated traveling start position in one stroke, outputting the display information for displaying, as the movement destination candidate, a candidate for a redirection position of the vehicle in a manner of being superimposed on an ambient image of the vehicle, and outputting the display information related to a following next stroke after the vehicle is caused to travel to the movement destination candidate selected by the user.

(Supplementary Note 18)

The driving assistance method according to the supplementary note 15, further comprising causing the vehicle, in the teaching traveling mode, to travel from a current position to a movement destination candidate selected by the user from among the one or more movement destination candidates in accordance with a driving operation of the user.

(Supplementary Note 19)

The driving assistance method according to any one of the supplementary notes 11 to 18, wherein the teaching traveling mode is a mode for registering a target path of parking of the vehicle in a parking space or exiting from the parking space in the automated traveling mode.

(Supplementary Note 20)

The driving assistance method according to any one of the supplementary notes 11 to 19, further comprising displaying, on a display device, the display screen on the basis of the display information, the display device being disposed to be visually recognizable by a user.

(Supplementary Note 21)

A vehicle including:

the driving assistance device according to any one of the supplementary notes 1 to 10; and an operation unit that receives an operation related to designation of an automated traveling start position by a user.

(Supplementary Note 22)

A vehicle including:

the driving assistance device according to any one of the supplementary notes 6 to 8 and the supplementary notes that directly or indirectly depend on at least one of the supplementary notes 6 to 8; and an operation unit that receives an operation related to selection of a movement destination candidate by a user.

(Supplementary Note 23)

A vehicle including:

the driving assistance device according to any one of the supplementary notes 1 to 9; and a display device that is disposed to be visually recognizable by a user and displays the display screen on the basis of the display information output from the display image generation unit.

(Supplementary Note 24)

A vehicle including:

the driving assistance device according to any one of the supplementary notes 1 to 10; and a control device that controls at least one of a steering angle, driving, and braking on the basis of a control signal from the vehicle control unit.

(Supplementary Note 25)

A vehicle including:

the driving assistance device according to any one of the supplementary notes 1 to 10; and one or more of a sonar, a surround view camera, a steering angle sensor, a wheel speed sensor, an azimuth sensor, or a GNSS sensor.

(Supplementary Note 26)

A computer program for causing a computer to execute the driving assistance method according to any one of the supplementary notes 11 to 20.

(Supplementary Note 27)

A recording medium (or computer program product) in which the computer program according to the supplementary note 26 to be executed by a computer is recorded.

What is claimed is:

1. A driving assistance device comprising a hardware processor connected to a memory and configured to:
   perform processing in a teaching traveling mode, the processing including
      storing a teaching traveling path in the memory, the teaching traveling path being obtained by a vehicle traveling from a current position to an automated traveling start position designated by a user, and
      generating teaching data related to a teaching path, the teaching path being obtained by reversing the teaching traveling path in a manner of being directed from an end point toward a start point;
   cause the vehicle to travel along the teaching path in an automated traveling mode;
   generate, in the teaching traveling mode, a recommended path in which a turning radius of a stroke of forward travel is larger than a turning radius of a stroke of backward travel in a range from the current position to the automated traveling start position; and
   output, in the teaching traveling mode, display information for displaying a display screen including the recommended path.

2. The driving assistance device according to claim 1, wherein the hardware processor generates one or more path candidates for the vehicle including the recommended path, the path candidate being generated on the basis of performance of the vehicle at a time of backward travel of the vehicle for a stroke of the forward travel and on the basis of performance of the vehicle at a time of forward travel of the vehicle for a stroke of the backward travel.

3. The driving assistance device according to claim 2, wherein the performance of the vehicle is maximum capability related to a rotation range or a rotation speed of an electric power steering of the vehicle.

4. The driving assistance device according to claim 1, wherein, when an instruction on a start of the teaching traveling mode is given by a user, the hardware processor outputs display information for displaying one or more candidates for the automated traveling start position in a manner of being superimposed on an ambient image of the vehicle.

5. The driving assistance device according to claim 1, wherein the hardware processor
   generates, for a next stroke, one or more movement destination candidates including a position corresponding to the recommended path and one or more path candidates for the one or more movement destination candidates including the recommended path, and
   outputs display information for displaying at least the one or more movement destination candidates out of the one or more movement destination candidates and the one or more path candidates, the one or more movement destination candidates to be displayed by the display information being superimposed on an ambient image of the vehicle.

6. The driving assistance device according to claim 5, wherein the hardware processor causes the vehicle, in the teaching traveling mode, to travel along the path candidate from a current position to a movement destination candidate selected by a user from among the one or more movement destination candidates.

7. The driving assistance device according to claim 6, wherein, in a case where the next stroke is not a stroke capable of reaching the automated traveling start position in one stroke, the hardware processor
   outputs the display information for displaying, as the movement destination candidate, a candidate for a redirection position of the vehicle in a manner of being superimposed on an ambient image of the vehicle, and
   outputs the display information related to a following next stroke after the vehicle is caused to travel to the movement destination candidate selected by the user.

8. The driving assistance device according to claim 5, wherein the hardware processor causes the vehicle, in the teaching traveling mode, to travel from a current position to a movement destination candidate selected by the user from among the one or more movement destination candidates in accordance with a driving operation of the user.

9. The driving assistance device according to claim 1, wherein the teaching traveling mode is a mode for registering a target path of parking of the vehicle in a parking space or exiting from the parking space in the automated traveling mode.

10. The driving assistance device according to claim 1, further comprising a display device disposed to be visually recognizable by the user, the display device being configured to display the display screen on the basis of the display information output from the hardware processor.

11. A driving assistance method comprising:
    performing processing in a teaching traveling mode, the processing including
       storing a teaching traveling path in the memory, the teaching traveling path being obtained by a vehicle traveling from a current position to an automated traveling start position designated by a user, and
       generating teaching data related to a teaching path, the teaching path being obtained by reversing the teaching traveling path in a manner of being directed from an end point toward a start point;
    causing the vehicle to travel along the teaching path in an automated traveling mode;
    generating, in the teaching traveling mode, a recommended path in which a turning radius of a stroke of forward travel is larger than a turning radius of a stroke of backward travel in a range from the current position to the automated traveling start position; and
    outputting, in the teaching traveling mode, display information for displaying a display screen including the recommended path.

12. The driving assistance method according to claim 11, further comprising generating one or more path candidates for the vehicle including the recommended path, the path candidate being generated on the basis of performance of the vehicle at a time of backward travel of the vehicle for a stroke of the forward travel and on the basis of performance of the vehicle at a time of forward travel of the vehicle for a stroke of the backward travel.

13. The driving assistance method according to claim 12, wherein the performance of the vehicle is maximum capability related to a rotation range or a rotation speed of an electric power steering of the vehicle.

14. The driving assistance method according to claim 11, further comprising, when an instruction on a start of the teaching traveling mode is given by a user, outputting display information for displaying one or more candidates for the automated traveling start position in a manner of being superimposed on an ambient image of the vehicle.

15. The driving assistance method according to claim 11, further comprising:
    generating, for a next stroke, one or more movement destination candidates including a position corresponding to the recommended path and one or more path candidates for the one or more movement destination candidates including the recommended path, and outputting display information for displaying at least the one or more movement destination candidates out of the one or more movement destination candidates and the one or more path candidates, the one or more movement destination candidates to be displayed by the display information being superimposed on an ambient image of the vehicle.

16. The driving assistance method according to claim 15, further comprising causing the vehicle, in the teaching traveling mode, to travel along the path candidate from a current position to a movement destination candidate selected by a user from among the one or more movement destination candidates.

17. The driving assistance method according to claim 16, further comprising, in a case where the next stroke is not a stroke capable of reaching the automated traveling start position in one stroke, outputting the display information for displaying, as the movement destination candidate, a candidate for a redirection position of the vehicle in a manner of being superimposed on an ambient image of the vehicle, and outputting the display information related to a following next stroke after the vehicle is caused to travel to the movement destination candidate selected by the user.

18. The driving assistance method according to claim 15, further comprising causing the vehicle, in the teaching traveling mode, to travel from a current position to a movement destination candidate selected by the user from among the one or more movement destination candidates in accordance with a driving operation of the user.

19. The driving assistance method according to claim 11, wherein the teaching traveling mode is a mode for registering a target path of parking of the vehicle in a parking space or exiting from the parking space in the automated traveling mode.

20. The driving assistance method according to claim 11, further comprising displaying, on a display device, the display screen on the basis of the display information, the display device being disposed to be visually recognizable by a user.

* * * * *